No. 657,365. Patented Sept. 4, 1900.
J. J. SIMONS.
NUT LOCK.
(Application filed Mar. 27, 1900.)

(No Model.)

Witnesses.
F. G. Harder.
Jean Breifel.

Inventor
Johann Josef Simons
per Martin Schmetz
Attorney.

UNITED STATES PATENT OFFICE.

JOHANN JOSEF SIMONS, OF AIX-LA-CHAPELLE, GERMANY.

NUT-LOCK.

SPECIFICATION forming part of Letters Patent No. 657,365, dated September 4, 1900.

Application filed March 27, 1900. Serial No. 10,416. (No model.)

*To all whom it may concern:*

Be it known that I, JOHANN JOSEF SIMONS, mining engineer, a citizen of Germany, residing No. 44 Karlsgraben, Aix-la-Chapelle, Kingdom of Prussia, Germany, have invented certain new and useful Improvements in Nut-Locks; and I do hereby declare the following to be a full, clear, and exact description of the invention, such as will enable others skilled in the art to which it appertains to make and use the same.

This invention relates to nut-locks, the object being to provide a device by means of which a number of nuts in a row can be prevented from turning and the nut-lock itself be fastened to the nuts. The present device differs, therefore, from other nut-locks in this respect that the device once fastened to the nuts, as hereinafter described, will not leave the nuts nor permit the latter to leave the bolts, if jarring takes place.

Figure 1:
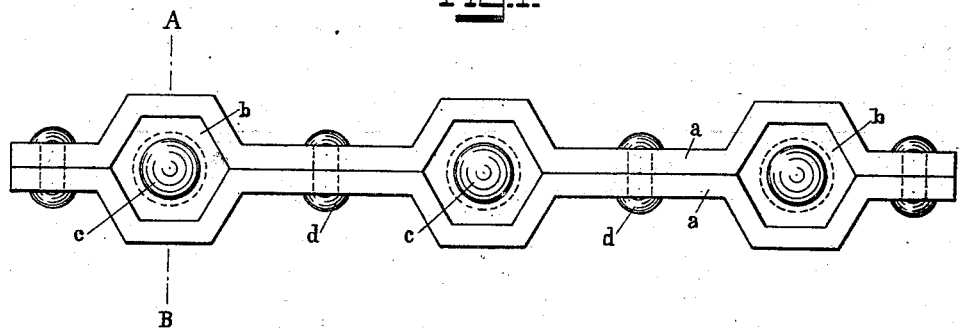
Figure 2:
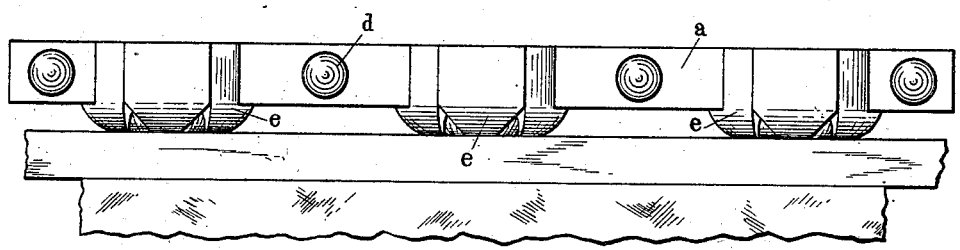
Figure 3:
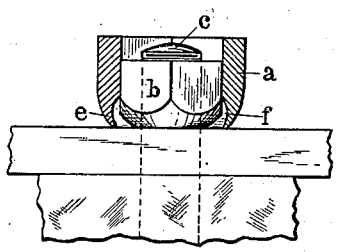

In the accompanying drawings, Figure 1 is a plan view of the new nut-lock; Fig. 2, a side elevation of the same; Fig. 3, a section of the nut-lock on line A B of Fig. 1, showing the device placed over the nuts, but not fastened thereto; and Fig. 4, the same section showing the nut-lock fastened to the nuts.

The bars $a$ may be of any suitable length and shaped to suit the size of the nuts $b$ and the spacing of the bolts or studs $c$ and are held together by rivets $d$ or other means. The parts adjacent to the flats of the nuts are provided with tapering teeth or projections $e$, which on their inside are undercut at $f$ in order to facilitate their clenching when the nut-lock is fastened down.

Figure 4:
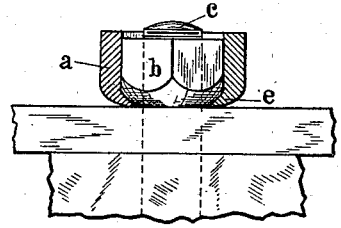

In order to render the attachment of the nut-lock faultless, the under side of the nuts $b$ has been rounded off considerably, and if the fastening of the device has been executed, as shown in Fig. 4, the working loose of the nuts will be next to impossible.

The nature of the nut-lock makes it particularly suitable for securing the nuts upon fish-plates of rail-joints, for once fastened thereto they would never leave them.

I claim—

A nut-lock consisting of two united bars of which those parts surrounding the nuts terminate in tapered projections which on their inner sides are undercut in order to facilitate the fastening of the lock upon the nuts as shown and described.

In testimony whereof I affix my signature in presence of two witnesses.

JOHANN JOSEF SIMONS.

Witnesses:
HEINRICH GROSS,
GORDON SCOTT.